(12) United States Patent
Eriksen et al.

(10) Patent No.: US 10,260,484 B2
(45) Date of Patent: Apr. 16, 2019

(54) BEARING ARRANGEMENT

(71) Applicant: SIEMENS AKTIENGESELLSCHAFT, München (DE)

(72) Inventors: Uffe Eriksen, Horsens (DK); Edom Lemma, Vejle (DK); Kim Thomsen, Skørping (DK); Morten Thorhauge, Aarhus (DK)

(*) Notice: Subject to any disclaimer, the term of this patent is extended or adjusted under 35 U.S.C. 154(b) by 0 days.

(21) Appl. No.: 15/657,309

(22) Filed: Jul. 24, 2017

(65) Prior Publication Data

US 2018/0030964 A1  Feb. 1, 2018

(30) Foreign Application Priority Data

Jul. 29, 2016 (EP) .................................... 16181950

(51) Int. Cl.
| | | |
|---|---|---|
| *F16C 17/02* | (2006.01) | |
| *F03D 80/70* | (2016.01) | |
| *F16C 41/02* | (2006.01) | |
| *F16C 17/03* | (2006.01) | |
| *F16C 17/26* | (2006.01) | |

(52) U.S. Cl.
CPC .............. *F03D 80/70* (2016.05); *F16C 17/02* (2013.01); *F16C 17/03* (2013.01); *F16C 17/26* (2013.01); *F16C 41/02* (2013.01); *F05B 2240/53* (2013.01); *F05B 2240/60* (2013.01);
(Continued)

(58) Field of Classification Search
CPC .......... F16C 17/02; F16C 17/08; F16C 17/26; F16C 2300/32; F16C 2360/31; F05B 2240/53; F05B 2240/60
See application file for complete search history.

(56) References Cited

U.S. PATENT DOCUMENTS 3,791,703 A * 2/1974 Ifield ..................... F01B 3/0073
384/117
3,972,572 A   8/1976 Hohn
(Continued)

FOREIGN PATENT DOCUMENTS

| CH | 558481 A | 1/1975 |
|---|---|---|
| CN | 102472253 A | 5/2012 |

(Continued)

OTHER PUBLICATIONS

European Exam Report (Communication pursuant to Article 94(3) EPC dated Nov. 9, 2018 for Application No. 16 181 950.3.
(Continued)

*Primary Examiner* — Thomas R Hannon
(74) *Attorney, Agent, or Firm* — Schmeiser, Olsen & Watts, LLP

(57) ABSTRACT

A bearing arrangement of an electrical machine is provided that includes a drive shaft extending through a housing, the bearing arrangement including a front-end bearing arranged about a front end of the drive shaft, and a back-end bearing arranged about an opposite end of the drive shaft, wherein a bearing includes a plurality of bearing pads arranged in an annular space between the drive shaft and the housing, and wherein at least one bearing includes an uneven distribution of bearing pads about the drive shaft. Furthermore, a wind turbine including such a bearing arrangement is also provided.

13 Claims, 3 Drawing Sheets

(52) U.S. Cl.
CPC ...... *F16C 2300/14* (2013.01); *F16C 2300/32* (2013.01); *F16C 2360/31* (2013.01)

(56) References Cited

U.S. PATENT DOCUMENTS

| | | | | |
|---|---|---|---|---|
| 3,985,405 | A * | 10/1976 | Okano | F16C 17/03 384/117 |
| 4,032,199 | A | 6/1977 | Jenness | |
| 4,607,964 | A * | 8/1986 | Kramer | F16C 17/14 384/263 |
| 4,686,403 | A | 8/1987 | Hackstie et al. | |
| 4,743,125 | A * | 5/1988 | Dammel | F16C 27/02 384/99 |
| 5,372,430 | A * | 12/1994 | Orndorff, Jr. | B63H 23/326 384/116 |
| 6,012,386 | A * | 1/2000 | Lahtinen | D21G 1/0226 100/170 |
| 6,129,453 | A * | 10/2000 | Holopainen | D21G 1/0226 384/100 |
| 6,595,691 | B1 * | 7/2003 | Holopainen | D21G 1/002 384/100 |
| 8,052,327 | B2 * | 11/2011 | Fujikawa | F16C 32/0666 384/109 |
| 8,436,483 | B2 * | 5/2013 | Perner | F03B 11/06 290/44 |
| 9,797,378 | B2 * | 10/2017 | Pedersen | F16C 17/10 |
| 9,995,283 | B2 * | 6/2018 | Stiesdal | F03D 80/50 |
| 2012/0099993 | A1 | 4/2012 | Guerenbourg et al. | |
| 2012/0228878 | A1 * | 9/2012 | Perner | F03B 13/264 290/54 |
| 2014/0133985 | A1 * | 5/2014 | Mongeau | F16C 17/02 416/95 |
| 2014/0169952 | A1 | 6/2014 | Pedersen et al. | |
| 2014/0321781 | A1 * | 10/2014 | Pedersen | F03D 11/0008 384/320 |
| 2014/0377063 | A1 * | 12/2014 | Guerenbourg | F16C 17/02 416/1 |

FOREIGN PATENT DOCUMENTS

| | | | |
|---|---|---|---|
| CN | 103762028 A | 5/2014 | |
| DE | 2010628 | * 10/1971 | |
| DE | 2010628 A1 | 10/1971 | |
| EP | 3252306 A1 * | 12/2017 | F16C 17/028 |
| GB | 154100 A | 11/1920 | |

OTHER PUBLICATIONS

Non-English Chinese Office Action dated Oct. 24, 2018 for Application No. 201710629891.0.

* cited by examiner

BEARING ARRANGEMENT

CROSS-REFERENCE TO RELATED APPLICATION

This application claims priority to European Application No. 16181950.3 having a filing date of Jul. 29, 2016, the entire contents of which are hereby incorporated by reference.

FIELD OF TECHNOLOGY

The following describes a bearing arrangement of an electrical machine, to support a drive shaft inside a housing. The following further describes a wind turbine comprising such a bearing arrangement.

BACKGROUND

A wind turbine generally comprises a nacelle mounted on top of a tower, and enclosing a generator. One type of generator is mounted to a drive shaft, which is turned by a rotor comprising a number of blades mounted to a hub at the upwind end of the nacelle. The rotor turns in response to an airflow over the blades. The drive shaft must be securely held in some way to ensure efficient transfer of the rotation to the generator. To this end, a drive shaft is usually held in place by a housing, with one or more main bearings between drive shaft and housing to allow a smooth motion of the drive shaft. Usually, the main bearing is constructed using a roller bearing such as a ball bearing, roller bearing or tapered roller bearing.

However, the balls or rollers of such bearings must be machined to a very high degree of precision, and are generally very expensive. Wear and tear can result in damage to one or more bearings and the raceways. To replace a damaged part (roller or ball), it is generally necessary to dismantle the entire cage or race containing the moving parts, so that repair and replacement procedures are generally expensive.

As an alternative to a ball bearing or roller bearing, it is possible to use a fluid bearing or sliding bearing instead. In a bearing such as a fluid bearing, a thin film of fluid between a bearing pad and the supported component allows the component to slide easily over the bearing pad. However, it is problematic to distribute and design the pads of the fluid or sliding bearings in such a way that wear and maintenance costs are minimized. Generally, multiple pads would be evenly spaced—i.e. arranged in a uniform distribution— around the circumference at each end of the drive shaft, since any bearing design generally aims to distribute the load evenly over the bearing parts. However, in the case of a fluid bearing or a sliding bearing, such a design involves a relatively large number of bearing pads, resulting in higher costs. A large number of pads also leads to increased power loss, a greater "out of tolerance" risk that can lead to an overloaded pad that is slightly too thick, a greater risk of pad failure, etc.

SUMMARY

An aspect relates to a main bearing that avoids the problems mentioned above.

According to embodiments of the invention, the bearing arrangement is intended for use in an electrical machine that comprises a drive shaft extending through a housing. The bearing arrangement comprises a front-end bearing arranged about a front end of the drive shaft, and a back-end bearing arranged about the other end of the drive shaft, wherein a bearing comprises a plurality of bearing pads arranged in an annular space between the drive shaft and the housing, and wherein at least one bearing comprises an uneven distribution of bearing pads about the drive shaft.

In the context of embodiments of the invention, the front-end bearing may be understood to be the front-end main bearing, and the back-end bearing may be understood to be a back-end main bearing. The drive shaft is then held in place by two main bearings, one at either end, i.e. one at the front end or "drive end", and one at the back end or "non-drive-end" of the drive shaft. When the electrical machine is the generator of a wind turbine, the front end is upwind, and the back end is downwind.

An advantage of the bearing arrangement according to embodiments of the invention is that the bearing pads are distributed in an optimal manner around the drive shaft to provide support exactly where it is needed. In this way, the drive shaft is always optimally supported under all loading conditions.

According to embodiments of the invention, the wind turbine comprises a generator with a drive shaft arranged to transfer rotation from a rotor of the wind turbine to a generator, and further comprises such a bearing arrangement arranged between the drive shaft and a drive shaft housing, installed as a main bearing to support the drive shaft in the housing.

An advantage of the bearing arrangement according to embodiments of the invention is that a main bearing that supports the drive shaft can be designed using a relatively economical fluid bearing or sliding bearing, while the wear on the bearing pads can be favourably minimized. In this way, the construction costs and maintenance costs can be reduced.

Particularly advantageous embodiments and features of the invention are given by the dependent claims, as revealed in the following description. Features of different claim categories may be combined as appropriate to give further embodiments not described herein.

In the following, it may be assumed that the wind turbine is driven by a rotor comprising a number of blades mounted to a hub at the upwind side. The rotating hub is mounted to a rotating drive shaft that is housed in a bearing housing. An electrical generator is mounted on the drive shaft and bearing housing. The drive shaft must be mounted in such a way that it is free to rotate, and in such a way that it is not affected by opposing forces. To this end, a drive shaft is usually enclosed by a housing, with a main bearing in an annular region at either end of the drive shaft.

In the context of embodiments of the invention, a main bearing is to be understood as a set of bearing pads arranged in an annular region at one end of the drive shaft. In the following, without restricting embodiments of the invention in any way, it may be assumed that a bearing comprises a fluid bearing or a sliding bearing.

A fluid bearing between a rotating shaft and a housing generally comprises a number of bearing pads each with a contact surface shaped to lie against the shaft. A bearing pad is generally mounted on a pivot or liner. A fluid film between the bearing pad and the rotating shaft ensures that the shaft can rotate smoothly about its axis.

The drive shaft may be regarded as an essentially cylindrical component arranged to lie horizontally, and which may be virtually divided into an upper half and a lower half by a horizontal plane that contains the axis of rotation of the drive shaft. The inventive bearing distribution can be defined in terms of this horizontal plane, so that the uneven distribution of bearing pads should be understood to mean that different numbers of bearing pads are arranged about the upper half and the lower half. For example, at one end of the drive shaft, a smaller number of bearing pads can be arranged over one semi-circular half, and a larger number of bearing pads can be arranged around the other semi-circular half.

In one preferred embodiment of the invention, the front-end bearing comprises an uneven distribution of bearing pads about the drive shaft. In a particularly preferred embodiment of the invention, the front-end bearing comprises more bearing pads arranged about the lower half of the drive shaft than the upper half of the drive shaft. For example, for a certain number of bearing pads arranged in the upper semi-circular half of the front-end bearing, there may be one or two more bearing pads arranged in the lower semi-circular half of the front-end bearing. In one exemplary embodiment of the inventive wind turbine generator, the front-end bearing comprises ten fluid bearing pads of which six are arranged about the lower half of the drive shaft.

Depending on the generator specifications and the loads to which it will be exposed, the uneven bearing distribution in the front-end bearing may be sufficient to ensure a favourable distribution of loads. Therefore, in such a design that involves a front-end bearing with an uneven bearing pad distribution, the back-end bearing can comprise an even bearing pad distribution.

However, particularly in the case of a large wind turbine generator, the back-end bearing may be subject to significant loading even if the front-end main bearing has been designed to withstand maximum loading. Therefore, in a further preferred embodiment of the invention, the back-end bearing comprises an uneven distribution of bearing pads about the drive shaft. In a particularly preferred embodiment of the invention, the back-end bearing comprises more bearing pads arranged about the upper half of the drive shaft than the lower half of the drive shaft. For example, for a certain number of bearing pads arranged in the lower semi-circular half of the back-end bearing, there may be one or two more bearing pads arranged in the upper semi-circular half of the back-end bearing. In another exemplary embodiment of the inventive wind turbine generator, the back-end bearing comprises ten fluid bearing pads of which six are arranged about the upper half of the drive shaft. In this case also, depending on the generator specifications and the loads to which it will be exposed, the uneven bearing pad distribution in the back-end bearing may be sufficient to ensure a favourable distribution of loads, and the front-end bearing can comprise an even bearing pad distribution.

Loading on the drive shaft of such a wind turbine generally manifests as a downward force on the front-end of the drive shaft and an upward force on the back-end of the drive shaft. Therefore, in a particularly preferred embodiment of the invention, the front-end main bearing comprises a greater number of bearing pads in its lower half, and the back-end main bearing comprises a greater number of bearing pads in its upper half. In this way, the uneven loading on the drive shaft can be optimally counteracted by the main bearings at either end. Of course, alternative embodiment are equally possible, with an even distribution of pads on the downwind side and an uneven distribution of pads on the upwind side; or an even distribution of pads on the upwind side and an uneven distribution of pads on the downwind side.

As indicated above, a main bearing comprises a set of bearing pads distributed around one end of the drive shaft. Preferably, the bearing pads of a main bearing are arranged symmetrically about a vertical axis. Such a vertical axis can be defined by a vertical plane containing the axis of rotation of the drive shaft. The vertical symmetry should be understood to relate to the number of bearing pads on either side of the vertical axis, for example five bearing pads on either side of the vertical axis. Using the exemplary front-end main bearing described above, two bearing pads would be arranged in the upper half on one side of the vertical axis, and three bearing pads would be arranged in the lower half on the other side of the vertical axis.

In a preferred embodiment of the inventive bearing arrangement, at least one bearing is equipped with a pressure application means that is realized to apply pressure to a bearing pad in order to press the bearing pad's contact surface against the outer surface of the drive shaft. In one preferred embodiment, the pressure application means comprises at least one spring-loaded component arranged between the housing and a bearing pad. For example, a pair of springs arranged one on each side of the bearing liner may effectively press the curved contact surface against the drive shaft, even when the drive shaft is subject to axial forces originating from the rotor. In an alternative realization, a pressure application means can comprise an actuator that is driven by a hydraulic motor or a linear motor. In either case, a pressure application means can be realised to press the pad against the shaft surface by applying pressure, or to or pull the pad towards the housing (away from the drive shaft) by reducing the applied pressure. The amount of pressure to be applied to or released from a pad can be adjusted as required in order to adjust the pad's freedom of movement.

BRIEF DESCRIPTION

Some of the embodiments will be described in detail, with reference to the following figures, wherein like designations denote like members, wherein.

DETAILED DESCRIPTION

Figure 1:
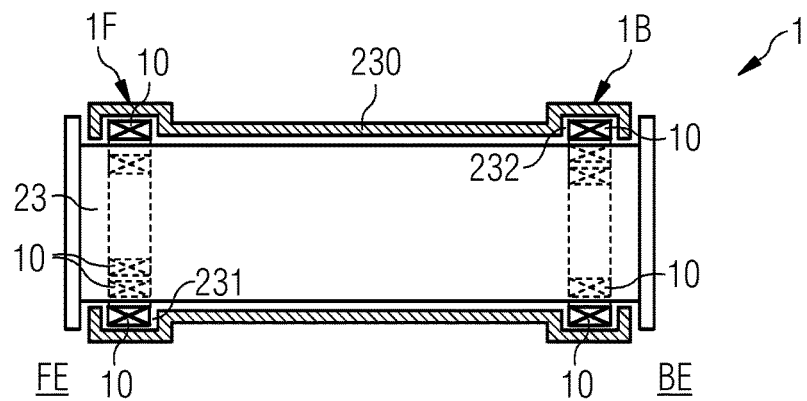
FIG. 1 shows a bearing arrangement according to embodiments of the present invention between a drive shaft and a drive shaft housing.

FIG. 1 shows a bearing arrangement 1 according to embodiments of the invention, used to support a drive shaft 23 in a drive shaft housing 230. The bearing arrangement 1 has a front-end bearing 1F in an annular space 231 at the front end FE of the drive shaft 23, and a back-end bearing 1B in an annular space 232 at the back end BE of the drive shaft 23. The diagram indicates an uneven distribution of bearing pads 10 at either end FE, BE.

Figure 2:
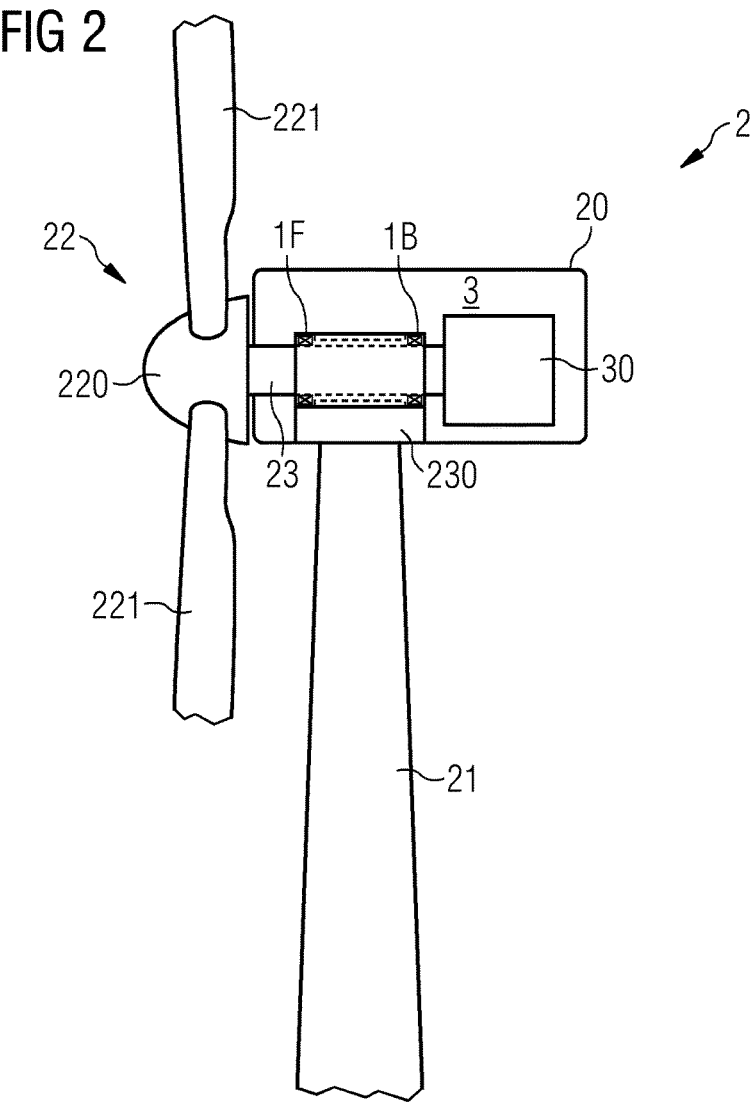
FIG. 2 shows a bearing arrangement according to embodiments of the present invention supporting a drive shaft of a wind turbine generator.

FIG. 2 shows the bearing arrangement 1 of FIG. 1 installed to support a drive shaft 23 of a wind turbine generator 3. A wind turbine 2 comprises a nacelle 20 on top of a tower 21. A rotor 22 comprising a hub 220 and blades 221 mounted to the hub 22 will turn in response to an airflow over the blades 221. The rotor 22 is mounted to a drive shaft 23 to transfer the rotation to a generator rotor 30 (indicated in a simplified manner in the diagram) of the generator 3. The drive shaft 23 is held in place by a housing 230, and annular bearings 1F, 1B at either end of the drive shaft 23 ensure that the drive shaft 23 is not displaced by the forces acting on it.

Figure 3:
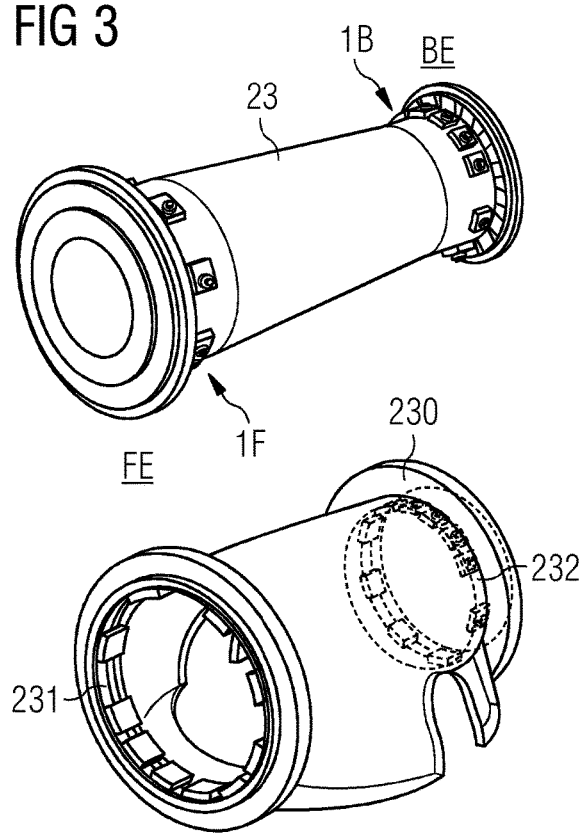
FIG. 3 shows an exploded view of the drive shaft and the drive shaft housing of FIG. 1, in accordance with embodiments of the present invention.

FIG. 3 shows an exploded view of the drive shaft 23 and the drive shaft housing 230 of FIGS. 1 and 2. The drive shaft 23 is shown on the left-hand side, with bearing pads 10 of a front-end annular bearing 1F arranged about the front end FE or drive-end of the drive shaft 23, and bearing pads 10 of a back-end annular bearing 1B arranged about the back end or non-drive-end of the drive shaft 22. The bearing pads 10 are shown in the positions in which they are held by the housing 230.

On the right-hand side of the diagram, the housing 230 is shown, indicating the annular spaces or races 231, 232 that contain the bearing pads 10 in their working positions for supporting the drive shaft 23. In this embodiment, the housing 230 is shaped to partially enclose the drive shaft 23 and to fit about a yaw ring at the top of the wind turbine tower. Openings at either side allow access between the tower 21 and the interior of the nacelle 20 in FIG. 2.

An axial load can be borne by thrust bearings at the down-wind side, by implementing a fluid bearing on either side of a drive shaft thrust collar.

Figure 4:
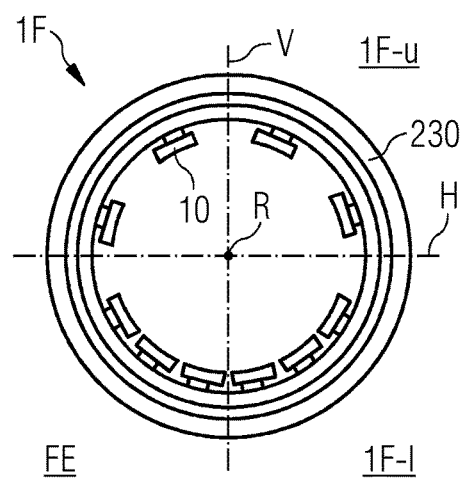
FIG. 4 shows a front-end bearing of an embodiment of the bearing arrangement according to embodiments of the invention.

FIG. 4 shows a front-end bearing 1F, looking into the housing 230 from the front end FE. A horizontal plane H through the drive shaft axis of rotation R is shown, along with a vertical plane V through the axis of rotation R, together dividing the annular form into four equal quadrants. The horizontal plane H divides the front-end bearing 1F into an upper half 1F_u and a lower half 1F_1. The diagram shows a greater number of fluid bearing pads 10 in the lower half 1F_1 (six in this case) and a smaller number of fluid bearing pads 10 in the upper half 1F_u (four in this case). The diagram also indicates that the fluid bearing pads 10 are arranged essentially symmetrically about the vertical plane V, disregarding an inherent asymmetry arising from the asymmetrical structure of a fluid bearing pad 10.

Figure 5:
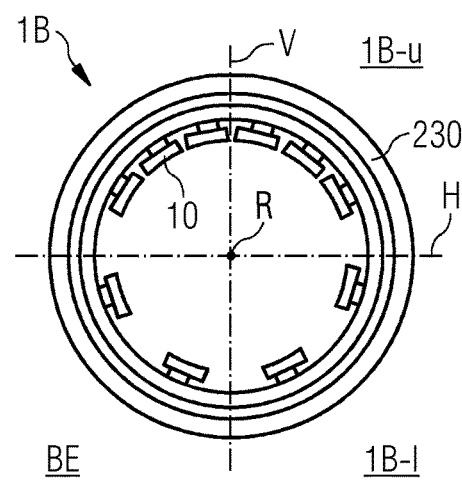
FIG. 5 shows a back-end bearing of an embodiment of the bearing arrangement according to embodiments of the invention.

FIG. 5 shows a back-end bearing 1B, looking into the housing 230 from the back end BE. Here also, a horizontal plane H through the drive shaft axis of rotation R is shown, along with a vertical plane V through the axis of rotation R, dividing the annular form into four quadrants. The horizontal plane H divides the back-end bearing 1B into an upper half 1B_u and a lower half 1B_1. The diagram shows a greater number of fluid bearing pads 10 in the upper half 1B_u (six in this case) and a smaller number of fluid bearing pads 10 in the lower half 1B_1 (four in this case).

Figure 6:
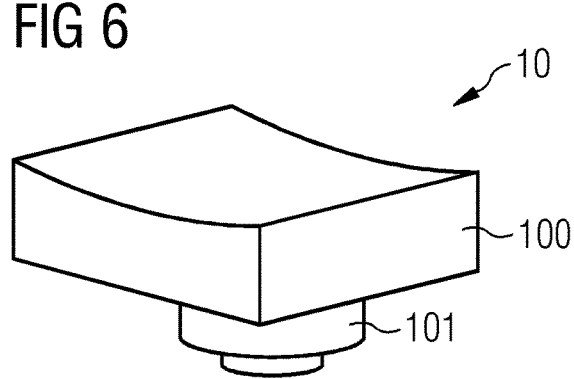
FIG. 6 shows a fluid bearing, in accordance with embodiments of the present invention.

FIG. 6 shows an exemplary fluid bearing pad 10, with a contact pad 100 mounted on a pivot liner 101. The surface of the contact pad 100 is shaped to match the surface of the rotating component (e.g. the drive shaft) which it is to support. As the skilled person will know, a fluid can be injected into a space between the contact surface and the outer surface of the supported component. As the supported component rotates, a film of fluid is maintained between these surfaces, allowing smooth rotation.

Figure 7:
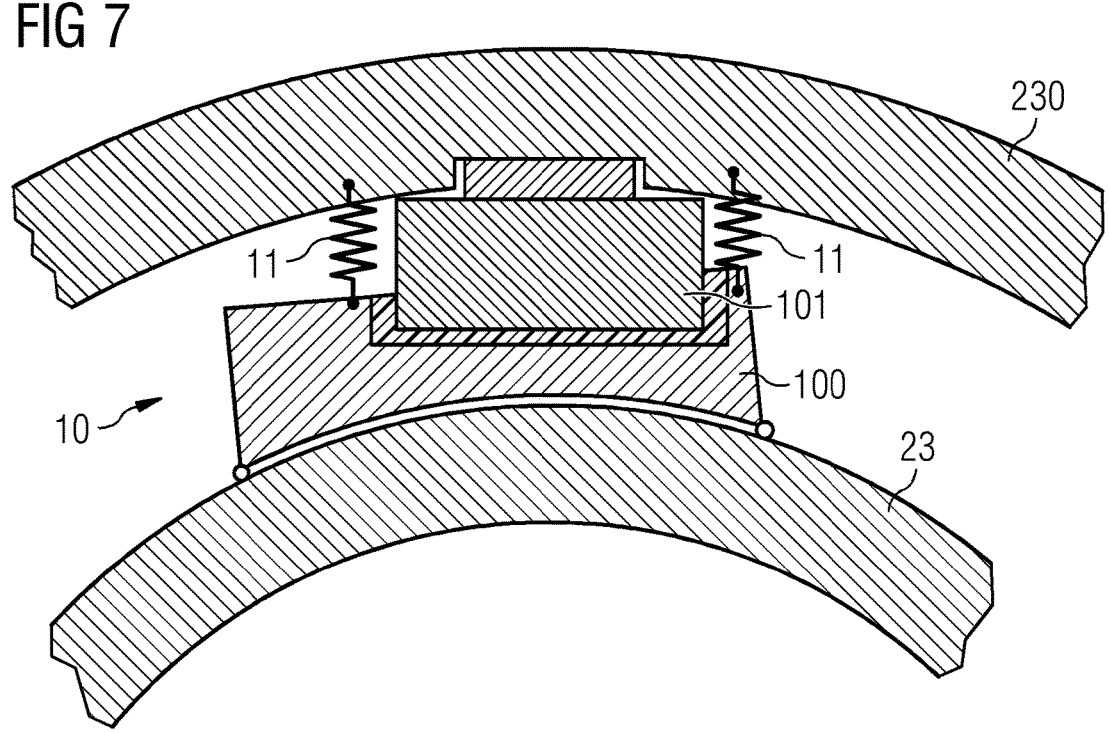
FIG. 7 shows a detail of a further embodiment of the bearing arrangement according to embodiments of the invention.

FIG. 7 shows a detail of a further embodiment of the bearing arrangement according to embodiments of the invention, and shows a bearing pad 10 in place between the drive shaft 23 and the housing 230. The diagram shows the contact pad 100 lying closely about the outer surface of the drive shaft 230. A spring-loaded element 11 is arranged to apply pressure to the bearing pad 10 so that the contact pad 100 always lies correctly on the outer surface of the drive shaft 230, even if the rotor applies an axial loading to the drive shaft 23.

Although the present invention has been disclosed in the form of preferred embodiments and variations thereon, it will be understood that numerous additional modifications and variations could be made thereto without departing from the scope of the invention.

The invention claimed is:

1. A bearing arrangement of an electrical machine that includes a drive shaft extending through a housing, the bearing arrangement comprising:
   a front-end bearing arranged about a front end of the drive shaft; and
   a back-end bearing arranged about an opposite end of the drive shaft;
   wherein the front-end bearing and the back-end bearing each comprise a plurality of bearing pads arranged in an annular space between the drive shaft and the housing, and wherein at least one bearing of the front-end bearing and the back-end bearing comprises an uneven distribution of the plurality of bearing pads about the drive shaft, wherein the front-end bearing and the back-end bearing are virtually divided into an upper half and a lower half by a horizontal plane containing an axis of rotation of the drive shaft, an uneven distribution of the plurality of bearing pads comprises different numbers of bearing pads in the upper half and the lower half.

2. The bearing arrangement according to claim 1, wherein the front-end bearing comprises the uneven distribution of the plurality of bearing pads about the drive shaft.

3. The bearing arrangement according to claim 1, wherein the front-end bearing comprises more bearing pads in the lower half of the front-end bearing than in the upper half of the front-end bearing.

4. The bearing arrangement according to claim 1, wherein the back-end bearing comprises more bearing pads in the upper half of the back-end bearing than in the lower half of the back-end bearing.

5. The bearing arrangement according to claim 1, wherein one of the front-end bearing and the back-end bearing comprises an uneven distribution of bearing pads about the drive shaft, and the other bearing comprises an even distribution of bearing pads the drive shaft.

6. The bearing arrangement according to claim 1, wherein at least one bearing of the front-end bearing and the back-end bearing is symmetrical about a vertical plane containing an axis of rotation of the drive shaft.

7. The bearing arrangement according to claim 1, wherein the front-end bearing and the back-end bearing each comprise a fluid bearing.

8. The bearing arrangement according to claim 1, wherein the front-end bearing and the back-end bearing each comprise a sliding bearing.

9. The bearing arrangement according to claim 1, wherein at least one of the front-end bearing and the back-end bearing comprises a pressure application means configured to press a contact surface of a bearing pad of the plurality of bearing pads onto an outer surface of the drive shaft.

10. The bearing arrangement according to claim 9, wherein the pressure application means comprises a spring-loaded element arranged between the housing and the bearing pad.

11. A wind turbine comprising a generator with a drive shaft arranged to transfer rotation from a rotor of the wind turbine to a generator rotor, and further comprising a bearing arrangement according to claim 1 arranged between the drive shaft and a drive shaft housing.

12. The wind turbine generator according to claim 11, wherein the front-end bearing comprises ten fluid bearing pads of which six are arranged in a lower half of the front-end bearing.

13. The wind turbine generator according to claim 11, wherein the back-end bearing comprises ten fluid bearings of which six are arranged in an upper half of the back-end bearing.

* * * * *